US010210284B2

(12) United States Patent
Cereghino

(10) Patent No.: US 10,210,284 B2
(45) Date of Patent: Feb. 19, 2019

(54) METHOD AND SYSTEM FOR MANAGING DATA IN A MANUFACTURING EXECUTION SYSTEM

(71) Applicant: SIEMENS AKTIENGESELLSCHAFT, Munich (DE)

(72) Inventor: Marco Cereghino, Genua (IT)

(73) Assignee: Siemens Aktiengesellschaft, Munich (DE)

(*) Notice: Subject to any disclaimer, the term of this patent is extended or adjusted under 35 U.S.C. 154(b) by 620 days.

(21) Appl. No.: 14/807,270

(22) Filed: Jul. 23, 2015

(65) Prior Publication Data

US 2016/0026735 A1 Jan. 28, 2016

(30) Foreign Application Priority Data

Jul. 23, 2014 (EP) .................................. 14178209

(51) Int. Cl.
G06F 17/30 (2006.01)
G06Q 10/06 (2012.01)
G06Q 50/04 (2012.01)

(52) U.S. Cl.
CPC .. *G06F 17/30979* (2013.01); *G06F 17/30182* (2013.01); *G06Q 10/06* (2013.01); *G06Q 50/04* (2013.01); *Y02P 90/30* (2015.11)

(58) Field of Classification Search
CPC ........ G06F 17/30979; G06F 17/30182; G06Q 10/06
USPC ........................................................ 707/769
See application file for complete search history.

(56) References Cited

U.S. PATENT DOCUMENTS

| | | | |
|---|---|---|---|
| 5,950,201 A * | 9/1999 | Van Huben | ............. G06F 17/50 |
| 6,327,594 B1 * | 12/2001 | Van Huben et al. | |
| 9,786,197 B2 * | 10/2017 | Asenjo et al. | .................... 705/5 |
| 2003/0217064 A1 | 11/2003 | Walters | |
| 2005/0154742 A1 * | 7/2005 | Roth et al. | .................... 707/100 |
| 2008/0071403 A1 | 3/2008 | Conway et al. | |
| 2012/0265915 A1 | 10/2012 | Goldstein et al. | |

OTHER PUBLICATIONS

Wikipedia; "Lock (database)"; Wikipedia, free Encyclopedia; pp. 1-2; URL: http//en.wikipedia.org/w/index.php?title=Lock_(database) &oldid=602794315;XP055165974;2014.

* cited by examiner

*Primary Examiner* — Jean B Fleurantin
(74) *Attorney, Agent, or Firm* — Laurence Greenberg; Werner Stemer; Ralph Locher

(57) ABSTRACT

A method and a system for managing data of a database in a MES system enables improved horizontal scalability of the client-server applications. The manufacturing execution system manages and controls the planning and execution of a production process of a product. Resources and clients generate and request data related to the production process. A relational database system includes a write database and a read database. A central service bus links the resources to the write database. A logical worker entity handles commands from the resources and clients queued in the central service bus, thereby interpreting the actions related to the write database, collecting the data required to complete the actions, and launching the execution of the command. A logical reader entity captures all data requests from the resources and clients, launching the requests for data from the read database and sending the data back to the requesting resource or client.

14 Claims, 3 Drawing Sheets

METHOD AND SYSTEM FOR MANAGING DATA IN A MANUFACTURING EXECUTION SYSTEM

CROSS-REFERENCE TO RELATED APPLICATION

This application claims the priority, under 35 U.S.C. § 119, of European patent application EP 14178209.4, filed Jul. 23, 2014; the prior application is herewith incorporated by reference in its entirety.

BACKGROUND OF THE INVENTION

Field of the Invention

The present invention relates to a method for managing the data in a manufacturing execution system (MES). The manufacturing execution system manages and controls the planning and the execution of a production process of a product.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. The manufacturing execution system (MES) is generally known as the IT layer that integrates the business systems (e.g. ERP) and production control systems.

Siemens Corporation offers a broad range of MES products, under its SIMATIC® IT product family.

As defined by the Manufacturing Enterprise Solutions Association (MESA International), the MES system "is a dynamic information system that drives effective execution of manufacturing operations," by managing "production operations from point of order release into manufacturing to point of product delivery into finished goods" and by providing "mission critical information about production activities to others across the organization and supply chain via bi-directional communication." The international standard for developing MES systems is commonly referred to as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking/tracing.

Thus, the goal of MES systems developed by software suppliers is to provide manufacturing companies (the customers) with tools for measuring and controlling production activities with the aim of boosting profitability, increasing productivity, improving quality and process performance to manufacturing plants.

As used herein, a software application is a set of software components developed, by software developers during the software developing phase, enabling to perform some useful actions within a MES system, e.g. monitoring values coming from plant process or controlling a plant device.

Typically, at engineering or configuration time, system engineers flexibly customize MES applications according to the specific manufacturing plant requirements.

At runtime, MES applications are utilized by end-users who may be plant operators or line responsible personnel.

In a MES system, usually client-server architectures are applied to manage the variety of different clients that require data related to the production process from other logical and/or physical entities (resources). This client-server approach usually implies the use of a centralized unique database for reading and writing activities of process related data. Unfortunately, in most environments not up to date Microsoft technologies, like ActiveX and .COM, are used that allow to develop client applications on Windows® and Internet Explorer® platforms only. Of course, the more user/clients simultaneously address the database for a reading or a writing activity, the more increases the risk to overload the server and the network due to these simultaneous client requests. This shortcoming can be remedied by scaling the applications vertically and improving the performance by adding more powerful machines which is an efficient but also expensive approach. Today, horizontal scalability of the applications is not becoming cost-effective and does not deliver the requested efficient performance. It is therefore easy to understand that concurrent message loads lead to lock situations on the data server side thereby hampering the scalability. Furthermore, the vertical scalability often limits the interoperability of applications since proper access points for external components/clients/resources are lacking. Changes of the business model are also more or less disabled.

SUMMARY OF THE INVENTION

It is accordingly an object of the invention to provide a method and a system which overcomes the above-mentioned and other disadvantages of the heretofore-known devices and methods of this general type and which provides a method and a system for managing data of a database in a MES system that enables better horizontal scalability of the client-server applications to write to and read from the database.

With the foregoing and other objects in view there is provided, in accordance with the invention, a method for managing the data in a manufacturing execution system, wherein the manufacturing execution system manages and controls the planning and the execution of a production process of a product. The method comprises the steps of:

a) providing a number of resources and/or clients, such as machines, working personnel, users, production line managers, applications, libraries, that are involved to execute the production process thereby generating and/or requesting data related to the production process;

b) providing a relational database system that stores the data related to the production process, said relational database system comprising a separate write database and a separate read database;

c) providing a central service bus which links the number of resources to the write database;

d) providing a logical worker entity being enabled to handle commands from the resources and/or clients queued in the central service bus thereby interpreting the actions related to the write database, collecting the data required to complete the actions and launching the execution of the command; and e) providing a logical reader entity being enabled to capture all data requests from the resources and/or clients thereby launching the requests to get data from the read database and sending this data back to the resource and/or clients requesting that data.

With the above and other objects in view there is also provided, in accordance with the invention, a system for managing the data in a manufacturing execution system, wherein said manufacturing execution system manages and controls the planning and the execution of a production process of a product. The novel system comprises:

a) a number of resources and/or clients, such as machines, working personal, users, production line managers, applications, libraries, that are involved to execute the production process thereby generating and/or requesting data related to the production process, b) a relational database system that stores the data related to the production process, said relational database system comprising a separate write database and a separate read database;

c) a central service bus which links the number of resources to the write database;

d) a logical worker entity being enabled to handle commands from the resources and/or clients queued in the central service bus thereby interpreting the actions related to the write database, collecting the data required to complete the actions and launching the execution of the command; and e) a logical reader entity being enabled to capture all data requests from the resources and/or clients thereby launching the requests to get data from the read database and sending this data back to the resource and/or clients requesting that data.

Therefore, the method and the system promote the desired horizontal scalability of the applications which interact with the relational database system by adopting the concept of the logical worker entity and the logical reader entity. These entities therefore use different channels to perform the write and the read operation on the write database and the read database resp. By the implementation of the central service bus (command bus), concurrent execution of request/answer tasks can be avoided.

In detail, the central service bus can be implemented to manage write operations using optimistic locking. The central service bus operates as message dispatcher and controller, assuring that a message is processed by a single request handler and that the operation is successfully completed in a reasonable timeframe, avoiding conflict and allowing handler scalability. Read operations use a different channel (as specified in the charts). In this way, there is no conflict in read/write and full scalability is supported.

In order to channelize the data stream from the read database and to the write database, it is suitable when the logical worker entity and the logical reader entity are using different logical and/or physical bus structures to access the respective databases. In particular, the logical worker entity handles write requests to the write database and the logical reader entity handles read requests from the read database thereby each using its own logical and/or physical bus structures.

In order to maintain a large accessability for the users of the relational database system, both the logical worker entity and the logical reader entity may benefit from the optimistic lock approach when accessing the respective database.

It has been observed that the business logic related to the production process and the business logic of the library domain may cause concurrent data access activities in the traditional client-server-architecture. It can be therefore foreseen that the business logic of the production process is decoupled from the data handling of the relational database. Therefore, concurrent data access activities on the respective databases by both the business logic of the product domain and the business logic of the library domain are far more relaxed.

In order to remedy concurrent execution of request/answer tasks of the write database, the central service bus (command bus) may be enabled to resolve conflicts related to a concurrent execution of request/answer tasks invoking the contribution of the write database. It is therefore within the power of the central service bus to queue and synchronize these tasks in order to avoid conflicts. Therefore, the central service bus supports the serialization of the operations, i.e. the possible operations are performed in a given order. In this sense, the central service bus is not only a dispatcher of the operations but also schedules the diverse operations prior to the dispatching.

Other features which are considered as characteristic for the invention are set forth in the appended claims.

Although the invention is illustrated and described herein as embodied in a management method and system for data in a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
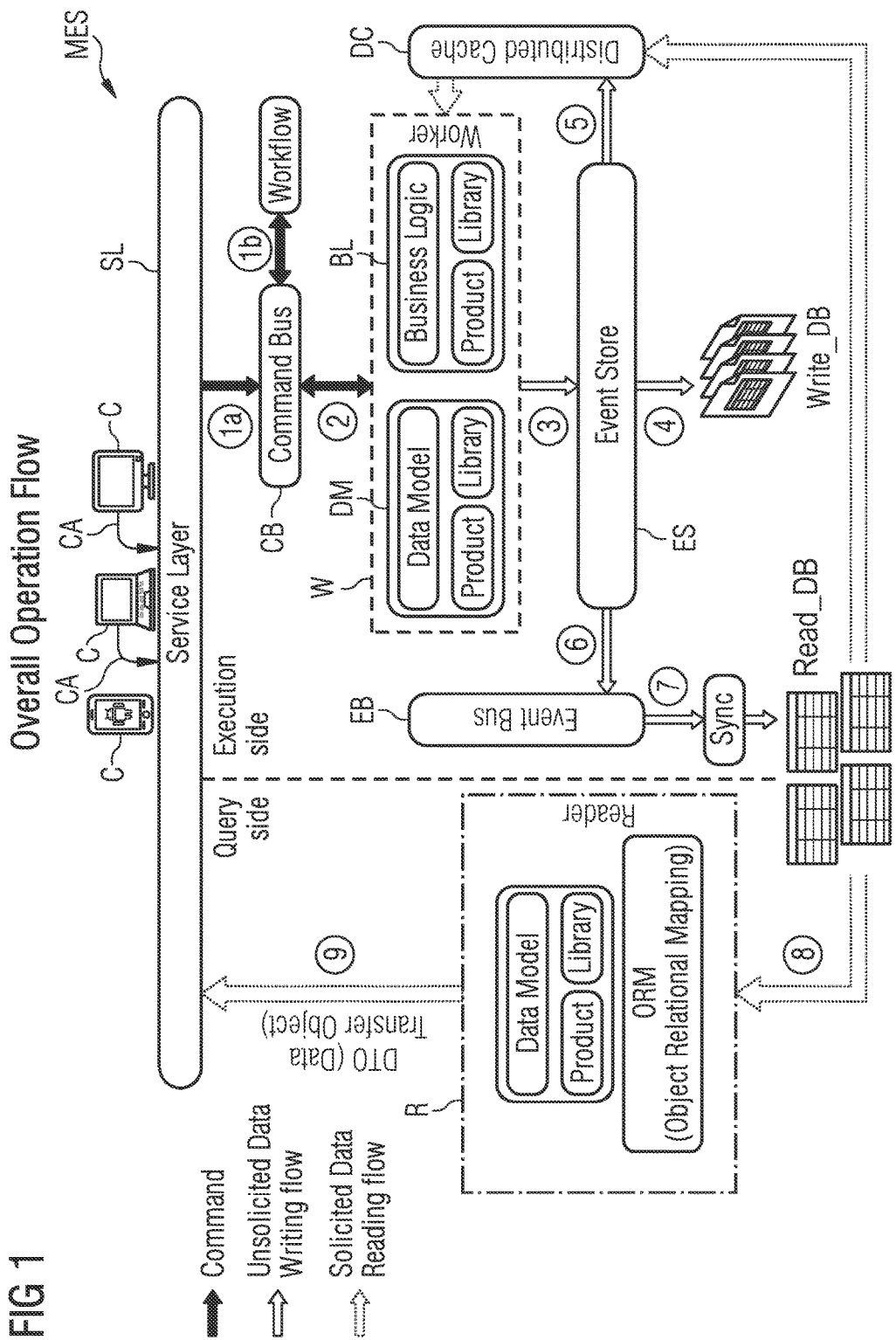
FIG. 1 a block diagram schematically illustrating the overall operational workflow in order access to/from a database by a client application through a central service bus (command bus) and the logical worker and reader entity.

Referring now to the figures of the drawing in detail and first, particularly, to FIG. 1 thereof, some embodiments of the present invention are shown in the context of the above-described issue in which an MES database system of a manufacturing execution system 2 (see the above description in the introductory text) is accessed in an MES system by a client application CA stemming from an authenticated client/user C. The MES database system comprises a write database Write_DB and a read database Read_DB which are physically separated and logically operated independently. In detail, these two databases are provided as structured data files according to the data model of the MES. They can reside either on the same data processing unit (machine) or on two different machines depending on the complexity of the installation of the MES.

The right side of the diagram hereinafter referred to as execution side ES describes the flow of information and operations involved into the process of writing information into the write database Write_DB. The arrows in the diagram have the following meaning. A bold arrow represents a command action; a light arrow represents an unsolicited data writing flow and the hatched arrow represents a solicited data reading flow. The trigger of a writing process can be:

At 1*a*: a request from an external device controlled by the authenticated user C (client) arriving via a service layer SL; or At 1*b*: an action requested by the workflow of the MES system, i.e. by the high-level workflow of the SIMATIC® IT, according to the configured high-level business logic BL.

Both the business logic BL and a data model DM reside in a logical worker entity W, but are logically decoupled in order to access and amend both the data model DM and the business logic BL independently during engineering phase (for planning and scheduling the production of a product controlled and managed by the MES and execution phase (for executing the production of the product controlled and managed by the MES).

In both these cases, when a write request arrives, a command message is stored into a central service bus hereinafter referred to as command bus CB. At 2, logical request handlers which are exposed by the worker W to the command bus CB and subscribe to this type of command message read the command message, process the command message and the logical transactions foreseen therein, and store intermediate results of the computation (logical transactions) back into the command bus CB.

At 3: When a writing operation is needed, the logical request handlers leverage on an event store ES, which maintains these intermediate results as "data slices," i.e. records resulting from a single command handler action, which are not normalized, in an internal cache assigned to the event store ES.

At 4: When the owner of the logical request handler who performed the logical transactions defined in the command message triggers a commit command which signals the end of a logical transaction, the event store ES writes the information into the write database Write_DB.

At 5: Optionally, it is possible to programmatically decide if writing the information (data) also into a distributed cache DC, for example for data which could be needed in the future in order to increase performance of the MES.

At 6: In parallel to the persistent storage onto the write database Write_DB, when a logical transaction is committed, the event store ES posts an event message into an event bus EB, said event message containing a "data block", i.e. a set of data slices belonging to the same transaction, to be propagated into the reading database Read_DB.

At 7, a mechanism for the synchronization of the data access actions on the reading database Read_DB hereinafter referred to as Sync is notified of the presence of a new event message in the event bus EV. The Sync mechanism retrieves the event message, organizes the information contained in the data block in a relational way and stores it into the reading database Read_DB. The Sync mechanism also notifies to a notification manager (not displayed here, for simplicity's sake) that the data belonging to the logical transaction have been committed, so that the request handlers can be aware of the "version" to which the reading database Read_DB has been updated.

The left side of the diagram—hereinafter referred to a query side QS—describes the flow of information and operations involved in the process of reading information from the MES database, in particular the reading database Read_DB.

The request handlers of a logical reader entity R retrieve at 8 from the reading database Read_DB the required information thereby using also the information provided by the notification manager with regards to the version of the data stored in the reading database Read_DB. The logical reader entity R then pushes at 9 the required information back to the appropriate client C.

Therefore, writing processes stemming from the command bus CB do not interfere with reading processes coming from the clients C. Both data streams and operations are logically and physically decoupled and use different bus systems and different databases as well as different logical entities, such as the described logical reader entity R and the described logical worker entity W.

Figure 2:
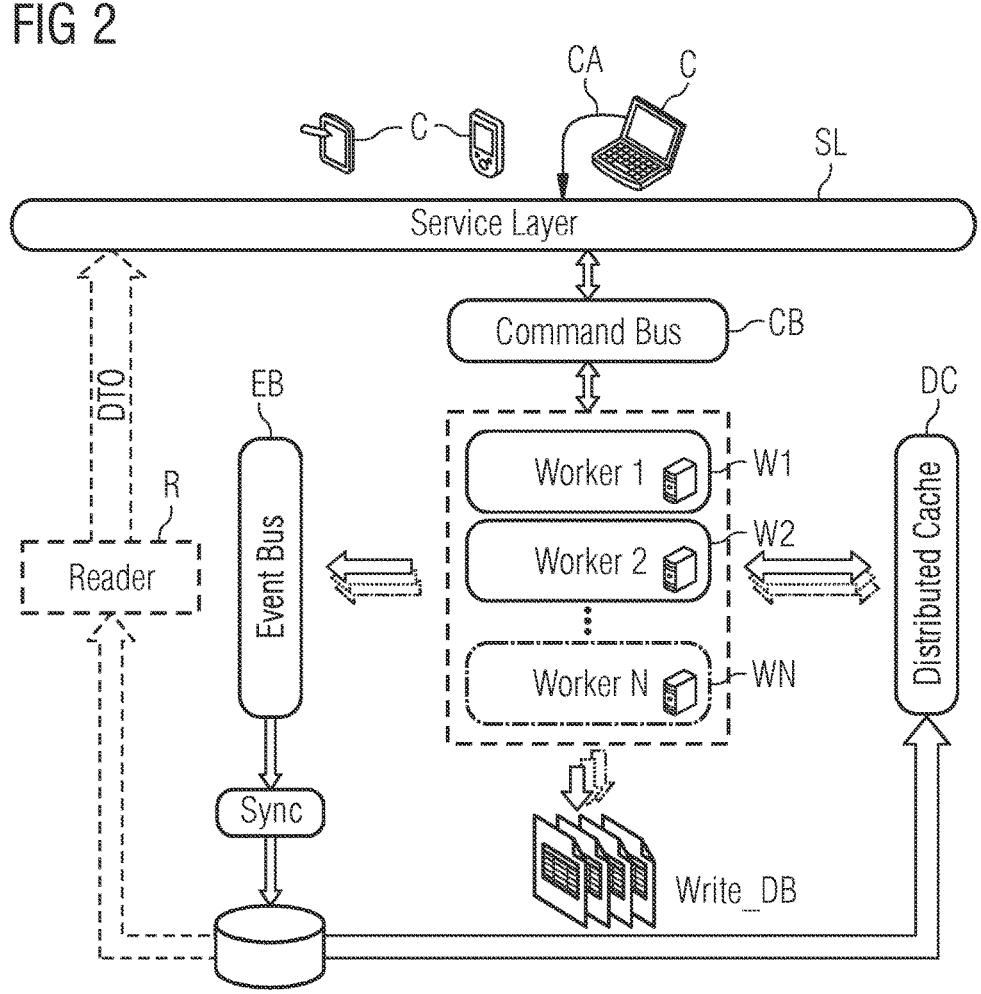
FIG. 2 a block diagram schematically illustrating the WRITE operation to the relational database.
Figure 3:
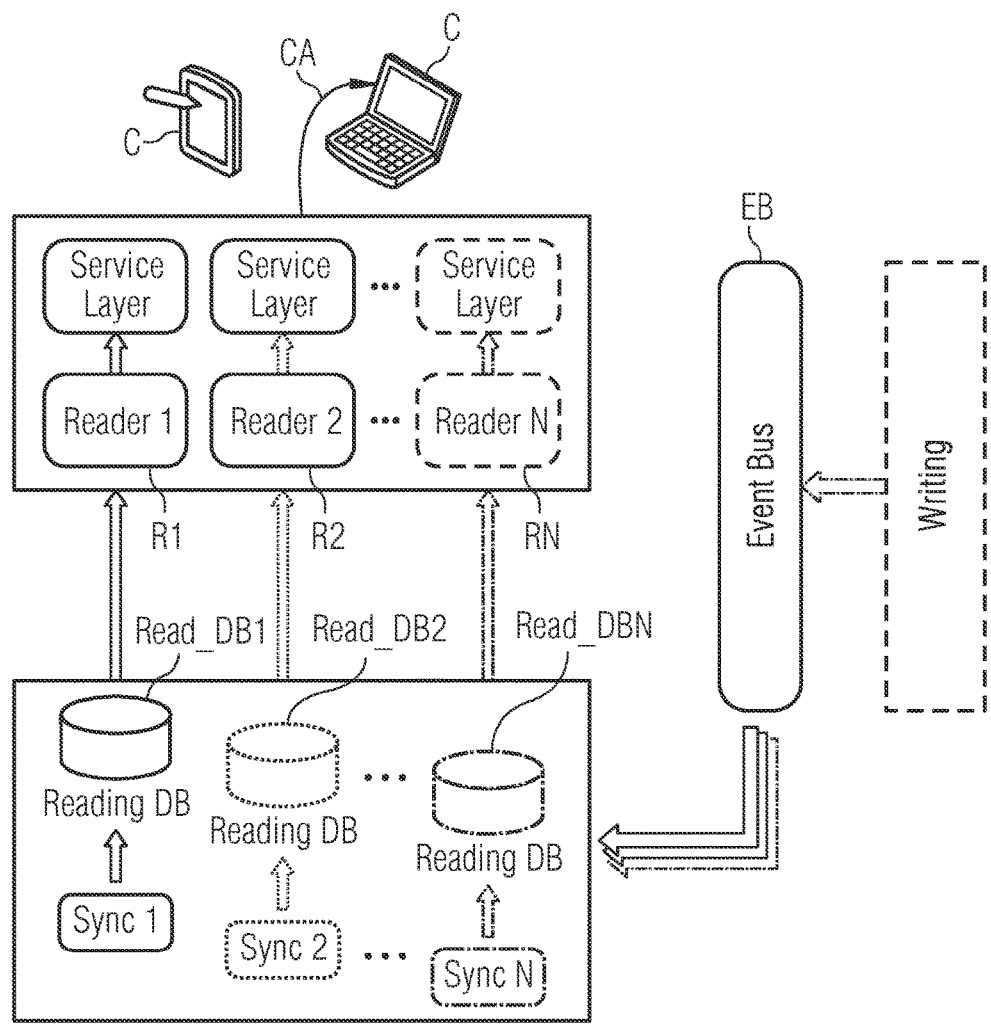
FIG. 3 a block diagram schematically illustrating the READ operation from the relational database.

FIG. 2 and FIG. 3 illustrate an example of the scalability of the execution in the writing and reading operations, respectively. This is effected by increasing the number of workers W1, W2, . . . , WN in writing (FIG. 2). In reading, the scaling is effected by increasing the number of the readers R1, R2, . . . , RN and of logical reading database Read_DB1, Read_DB2 . . . Read_DBN (FIG. 3).

The invention claimed is:

1. A method of managing data in a manufacturing execution system, the manufacturing execution system managing and controlling the planning and the execution of a production process for a product, the method comprising the following steps:
   a) providing a plurality of resources and clients involved in an execution of the production process, thereby generating data and requesting data related to the production process;
   b) providing a relational database system for storing the data related to the production process, the relational database system containing a separate write database and a separate read database, wherein the separate write database and the separate read database are provided as structured data files according to a data model of the manufacturing execution system;
   c) providing a central service bus linking the plurality of resources to the write database;
   d) providing a logical worker entity configured to handle commands from the resources and clients queued in the central service bus, thereby interpreting the actions related to the write database, collecting data required to complete the actions and launching an execution of the command; and
   e) providing a logical reader entity configured to capture all data requests from the resources and clients, thereby launching the requests to fetch data from the read database and sending said data back to the resource and client requesting said data.

2. The method according to claim 1, wherein the plurality of resources and clients are selected from the group consisting of machines, working personal, users, production line managers, applications, and libraries.

3. The method according to claim 1, which comprises using with the logical worker entity a bus having at least one structure selected from the group consisting of a logical bus structure and a physical bus structure to access the write database and using with the logical reader entity a bus having at least one structure selected from the group consisting of a logical bus structure and a physical bus structure to access the read database, wherein the bus used by the logical worker entity is different from the bus used by the logical reader entity.

4. The method according to claim 1, which comprises handling with the logical worker entity write requests to the write database and handling with the logical reader entity read requests from the read database, each using its own bus structure including at least one bus structure selected from the group consisting of a logical bus structure and a physical bus structure.

5. The method according to claim 1, wherein at least one entity selected from the group consisting of the logical worker entity and the logical reader entity benefit from an optimistic lock approach when accessing the relational database system.

6. The method according to claim 1, wherein the business logic of the production process is decoupled from a data model in the logical worker entity.

7. The method according to claim 1, which comprises resolving with the central service bus conflicts related to a concurrent execution of request/answer tasks invoking a contribution of at least one database selected from the group consisting of the read database and the write database.

8. A system for managing data in a manufacturing execution system, the manufacturing execution system managing and controlling the planning and execution of a production process for a product, the system comprising:
- a) a plurality of resources and clients involved in an execution of the production process for generating and requesting data related to the production process;
- b) a relational database system configured to store the data related to the production process, said relational database system including a separate write database and a separate read database, wherein the separate write database and the separate read database are provided as structured data files according to a data model of the manufacturing execution system;
- c) a central service bus for linking the plurality of resources to said write database;
- d) a logical worker entity configured to handle commands from said resources and clients queued in said central service bus, thereby interpreting actions related to the write database, collecting data required to complete the actions, and launching an execution of the command; and
- e) a logical reader entity configured to capture all data requests from said resources and clients, thereby launching the requests to obtain data from said read database and sending the data back to a respective said resource and client requesting the data.

9. The method according to claim 8, wherein said plurality of resources and clients are selected from the group consisting of machines, working personal, users, production line managers, applications, and libraries.

10. The system according to claim 8, wherein said logical worker entity uses a bus having at least one structure selected from the group consisting of a logical bus structure and a physical bus structure to access said write database and said logical reader entity uses a bus having at least one structure selected from the group consisting of a logical bus structure and a physical bus structure to access said read database, wherein the bus used by said logical worker entity is different from the bus used by said logical reader entity.

11. The system according to claim 8, wherein said logical worker entity is configured to handle write requests to said write database and said logical reader entity is configured to handle read requests from said read database, each of said logical worker entity and aid logical reader entity using its own bus structure including at least one bus structure selected from the group consisting of a logical bus structure and a physical bus structure.

12. The system according to claim 8, wherein at least one entity selected from the group consisting of said logical worker entity and said logical reader entity benefit from an optimistic lock approach when accessing said relational database system.

13. The system according to claim 8, wherein a business logic of the production process is decoupled from a data model in said logical worker entity.

14. The system according to claim 8, wherein said central service bus is configured to resolve conflicts related to a concurrent execution of request/answer tasks invoking a contribution of at least one database selected from the group consisting of said read database and said write database.

\* \* \* \* \*